United States Patent
Yoon et al.

(10) Patent No.: US 10,354,151 B2
(45) Date of Patent: Jul. 16, 2019

(54) METHOD OF DETECTING OBSTACLE AROUND VEHICLE

(71) Applicants: HYUNDAI MOTOR COMPANY, Seoul (KR); KIA MOTORS CORPORATION, Seoul (KR); KOREA NATIONAL UNIVERSITY OF TRANSPORTATION Industry-Academic Cooperation Foundation, Chungju-si, Chungcheongbuk-do (KR)

(72) Inventors: Sung Won Yoon, Yongin-si (KR); Jeyeon Kim, Seoul (KR); Hoon Jo, Seoul (KR); Ho Gi Jung, Seoul (KR); Jae Kyu Suhr, Incheon (KR)

(73) Assignees: HYUNDAI MOTOR COMPANY, Seoul (KR); KIA MOTORS CORPORATION, Seoul (KR); KOREA NATIONAL UNIVERSITY OF TRANSPORTATION INDUSTRY-ACADEMIC COOPERATION FOUNDATION, Chungju-si, Chungcheongbuk-Do (KR)

( * ) Notice: Subject to any disclaimer, the term of this patent is extended or adjusted under 35 U.S.C. 154(b) by 14 days.

(21) Appl. No.: 15/706,227

(22) Filed: Sep. 15, 2017

(65) Prior Publication Data

US 2018/0307922 A1    Oct. 25, 2018

(30) Foreign Application Priority Data

Apr. 20, 2017    (KR) .................. 10-2017-0050982

(51) Int. Cl.
*G06K 9/00*    (2006.01)
*G06T 7/62*    (2017.01)
(Continued)

(52) U.S. Cl.
CPC ..... *G06K 9/00805* (2013.01); *G06K 9/00201* (2013.01); *G06K 9/4604* (2013.01); *G06K 9/4652* (2013.01); *G06K 9/6215* (2013.01); *G06T 7/13* (2017.01); *G06T 7/55* (2017.01); *G06T 7/62* (2017.01); *G06T 7/90* (2017.01);
(Continued)

(58) Field of Classification Search
CPC .. G06T 7/13; G06T 7/174; G06T 7/55; G06T 7/579; G06T 7/60; G06T 7/62; G06T 7/73; G06T 7/79; G06T 2207/30261; G06K 9/00791; G06K 9/00805; G05D 1/0246; G05D 1/0251; G08G 1/16; G08G 1/165
See application file for complete search history.

(56) References Cited

U.S. PATENT DOCUMENTS

| 2012/0010772 | A1* | 1/2012 | Pack et al. ............. | B25J 9/1664 701/27 |
| 2014/0018996 | A1* | 1/2014 | Mian et al. .......... | G05D 1/0212 701/26 |
| 2014/0118550 | A1* | 5/2014 | Yoon et al. ............. | H04N 7/18 348/148 |

* cited by examiner

*Primary Examiner* — Andrew W Johns
(74) *Attorney, Agent, or Firm* — Brinks Gilson & Lione

(57) ABSTRACT

Disclosed is a method of detecting obstacle around a vehicle. The method of detecting an obstacle around a vehicle, includes: acquiring an image of the obstacle around the vehicle using a monocular camera; creating, by a controller, a distance based cost map, a color based cost map and an edge based cost map from the image; and integrating, by the controller, the distance based cost map, the color based cost map, and the edge based cost map to create a final cost map, and estimating, by the controller, a height of the obstacle from the final cost map.

17 Claims, 25 Drawing Sheets

(51) Int. Cl.
   *G06T 7/90*    (2017.01)
   *G06T 7/13*    (2017.01)
   *G06K 9/46*    (2006.01)
   *G06K 9/62*    (2006.01)
   *G06T 7/55*    (2017.01)
(52) U.S. Cl.
   CPC ............... *G06T 2207/10024* (2013.01); *G06T 2207/10028* (2013.01); *G06T 2207/30261* (2013.01)

FIG. 9A
FIG. 9B
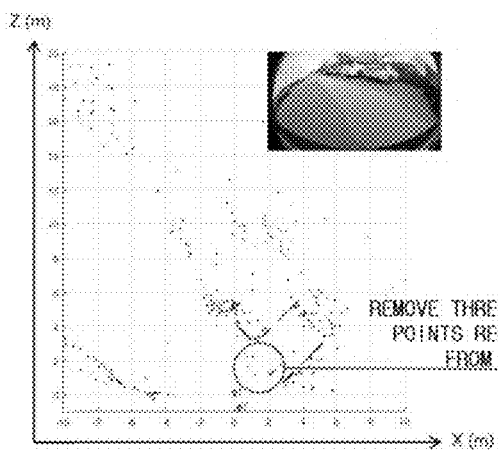
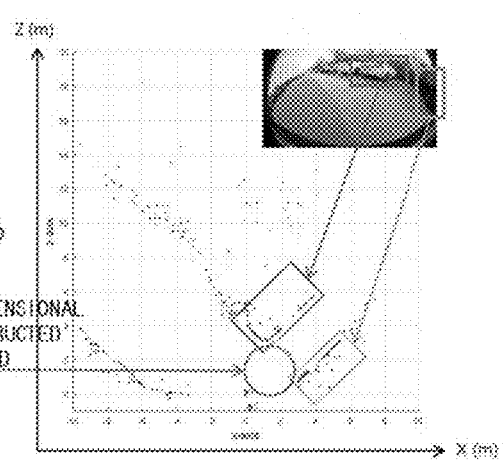

FIG. 11A   FIG. 11B
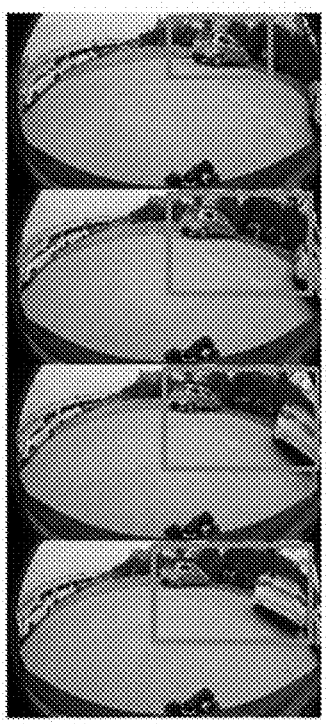 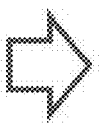 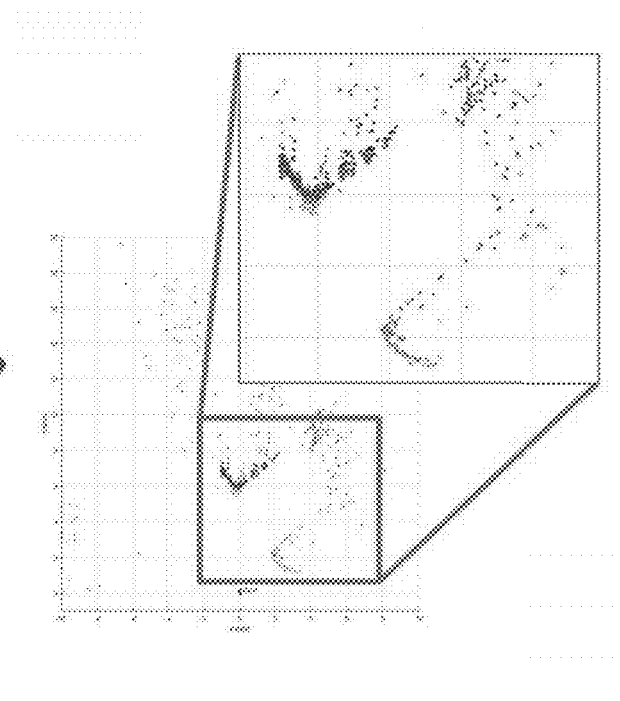

FIG. 12A FIG. 12B
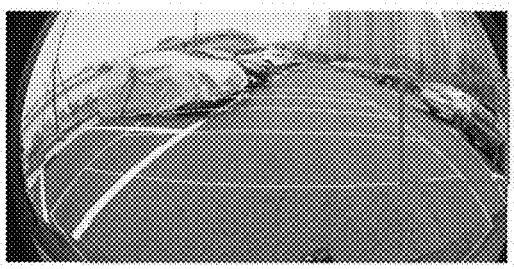
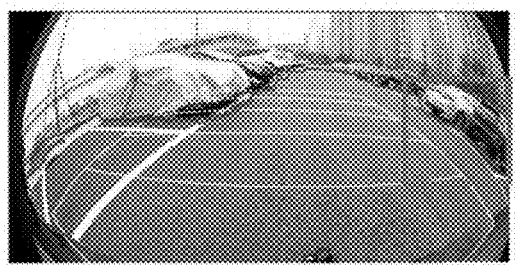
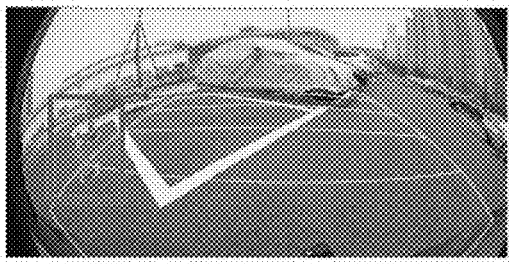
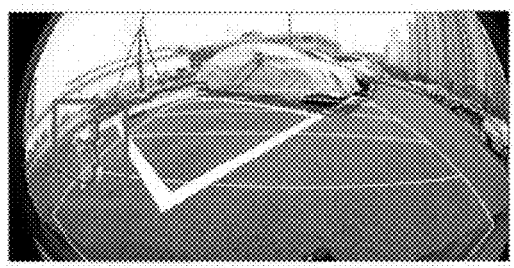

FIG. 13A
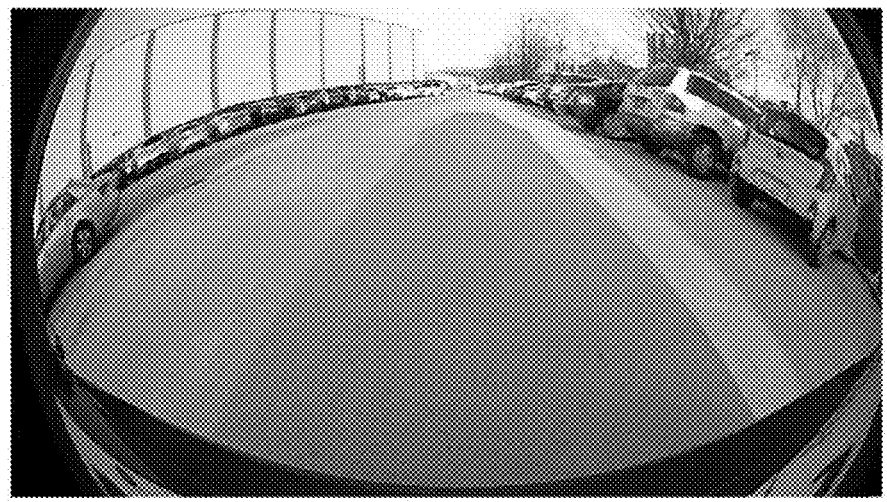
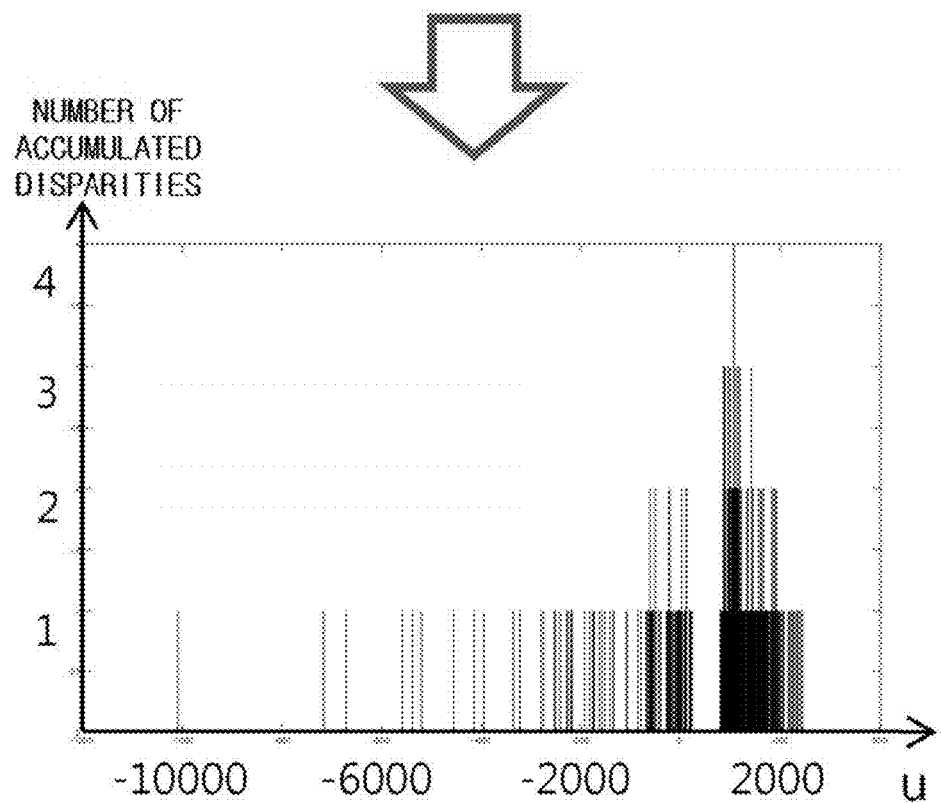
FIG. 13B

FIG. 17A
ORIGINAL FISH-EYE IMAGE
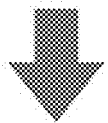
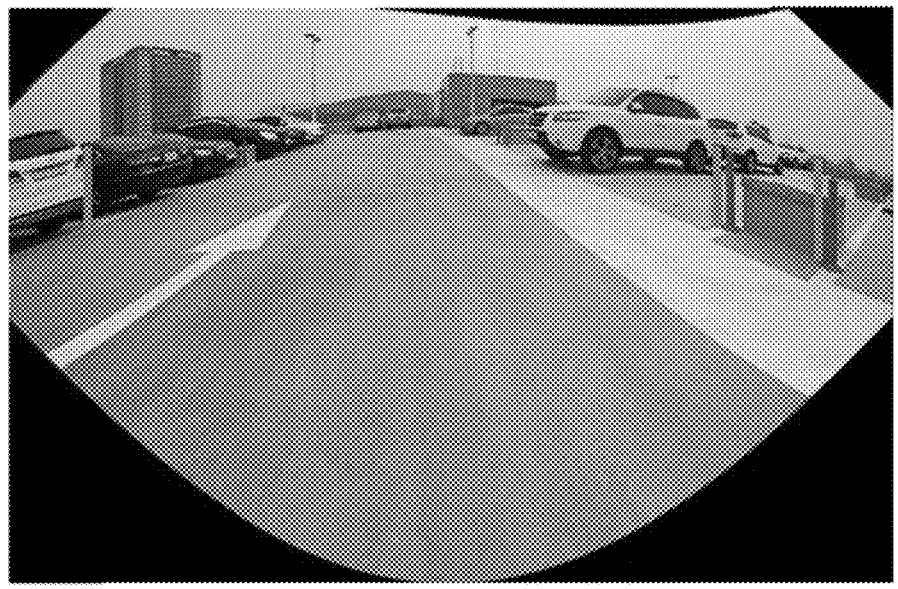
RESULT OF IMAGE CONVERSION
FIG. 17B

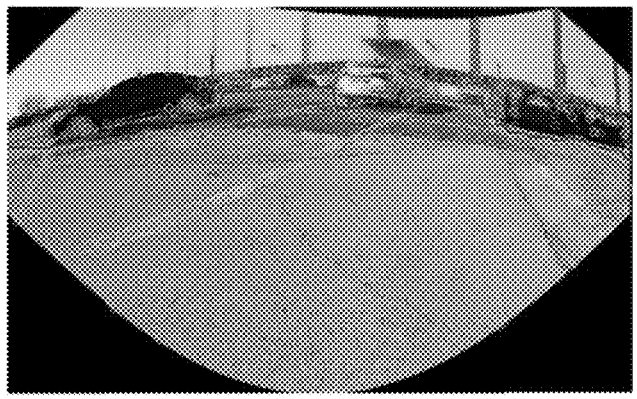
FIG. 18A
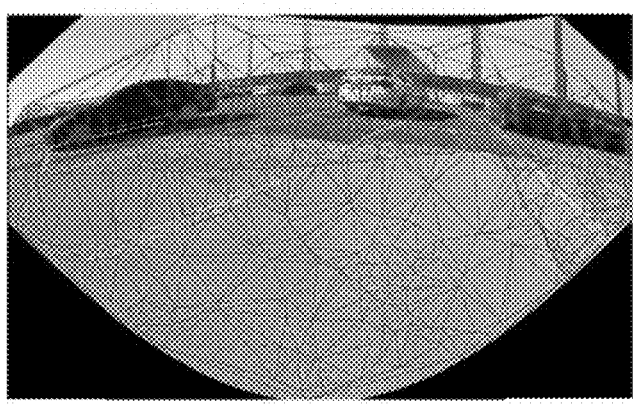
FIG. 18B
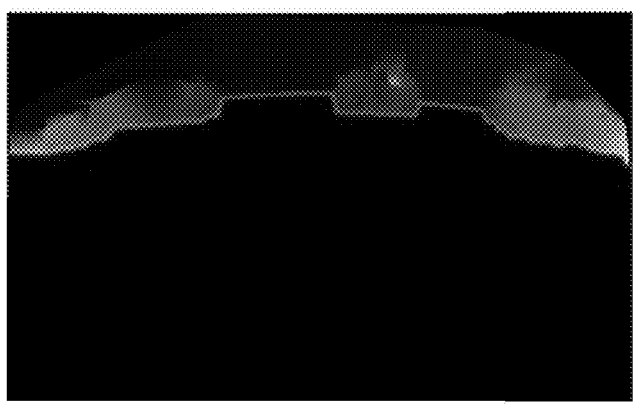
FIG. 18C

FIG. 22A
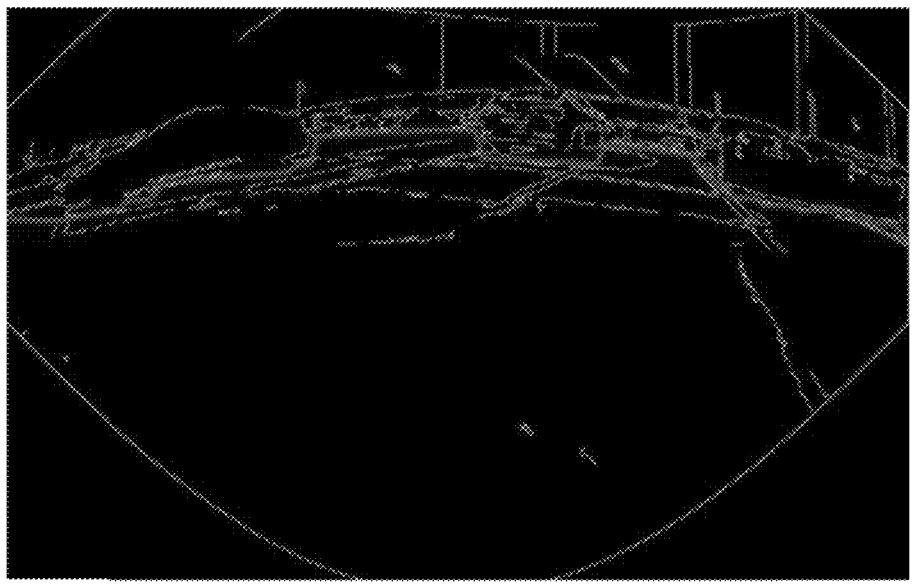
RESULT OF EDGE DETECTION
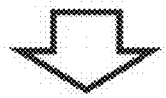
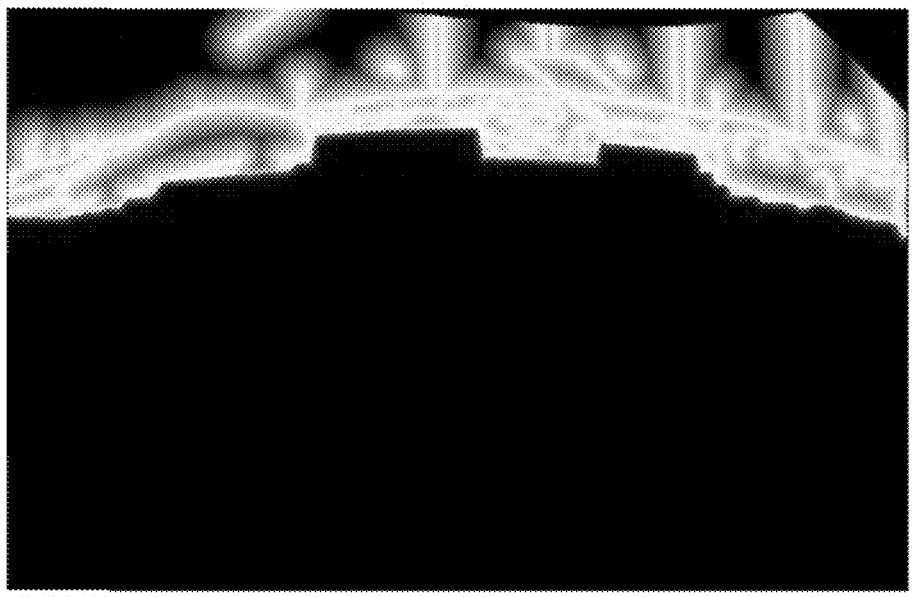
RESULT OF CALCULATION OF EDGE BASED COST MAP
FIG. 22B

METHOD OF DETECTING OBSTACLE
AROUND VEHICLE

CROSS-REFERENCE TO RELATED
APPLICATION

This application claims priority to and the benefit of Korean Patent Application No. 10-2017-0050982, filed on Apr. 20, 2017, which is incorporated herein by reference in its entirety.

FIELD

The present disclosure relates to a vehicle, and more particularly to an autonomous vehicle.

BACKGROUND

The statements in this section merely provide background information related to the present disclosure and may not constitute prior art.

An autonomous vehicle travels to a destination by itself even if a driver does not operate a steering wheel, an accelerator pedal, or a brake pedal. The autonomous vehicle is actually different from an unmanned vehicle traveling without a driver, but in these days, the terms "autonomous vehicle" and "unmanned vehicle" are used without distinction.

An example of autonomous driving is automatic parking. The automatic parking means that the autonomous vehicle itself finds empty parking space to perform parking by itself. To achieve the automatic parking, the autonomous vehicle should be equipped with three-dimensional environment recognition technology to detect surrounding geographic features and objects.

In order to detect geographical features and objects, a detection device, such as a binocular stereo camera, a radar, a lidar, and an ultrasonic sensor, is needed. However, the binocular stereo camera, the radar, and the lidar are expensive. Also, the ultrasonic sensor has difficulties in acquiring additional information, and has a short detection range.

SUMMARY

The present disclosure provides improved three-dimensional environment recognition technology using a single monocular camera of low cost.

In one form of the present disclosure, a method of detecting an obstacle around a vehicle, includes: acquiring an image of the obstacle around the vehicle using a monocular camera; creating, by a controller, a distance based cost map, a color based cost map and an edge based cost map from the image; and integrating, by the controller, the distance based cost map, the color based cost map, and the edge based cost map to generate a final cost map, and estimating, by the controller, a height of the obstacle from the final cost map.

The creating the distance based cost map includes: generating a plurality of Delaunay triangles by connecting feature points in the image and performing interpolation of distance information using a plane equation generated by three vertexes of each of the plurality of the Delaunay triangles; and estimating a disparity of pixels included in each of the plurality of the Delaunay triangles from a result of the interpolation.

The creating the color based cost map, includes: setting an area where color similarities are measured in the image, measuring the color similarities between all feature points existing in the area, and selecting a greatest color similarity value as a final color similarity; and calculating a difference between sums of the color similarities from the measured color similarities to create the color based cost map.

The creating of the edge based cost map, includes: performing edge detection on the image; and performing distance transformation based on edge detection such that pixels located closer to an edge have lower values.

The final cost map is calculated by Equation 6:

$$c_t = w_d c_d + w_c c_c + w_e c_e \qquad \text{<Equation 6>}$$

where, $w_d$ is a weight of the distance cost map, $w_c$ is a weight of the color cost map, and $w_e$ is a weight of the edge cost map, $c_d$, color $c_c$, and edge $c_e$.

In accordance with another aspect of the present disclosure, the method of detecting an obstacle around a vehicle, includes: acquiring an image of the obstacle around the vehicle using a monocular camera; reconstructing, by a controller, three-dimensional positions of corresponding points in the image; integrating, by the controller, previously reconstructed three-dimensional corresponding points with the currently reconstructed three-dimensional corresponding points based on a relative positional relationship between the previously reconstructed three-dimensional corresponding points and the currently reconstructed three-dimensional corresponding points; calculating, by the controller, a disparity value by applying a virtual baseline value formed by a movement of the monocular camera to a depth value obtained through three-dimensional reconstruction of the corresponding points; and estimating, by the controller, a boundary of the obstacle based on the disparity value.

The disparity value is calculated using Equation 1:

$$d = f\frac{B}{Z}, \qquad \text{<Equation 1>}$$

where the d is the disparity value to be obtained, the B is the virtual baseline value of the monocular camera, the Z is the depth value obtained through three-dimensional reconstruction, and the f is a focal length of the monocular camera.

The method further includes changing, when an angle of view of the monocular camera is a wide angle that is greater than or equal to a predetermined angle of view, a u-axis to an incident angular axis θu through the following equation:

$$\theta_u = \operatorname{atan}\left(\frac{u - o_x}{f}\right),$$

where, the u is the value of the u-axis, the $O_x$ is the center point of the monocular camera, and the f is the focal length of the monocular camera.

In accordance with another aspect of the present disclosure, a method of detecting an obstacle around a vehicle, includes: acquiring an image of the obstacle around the vehicle using a monocular camera; reconstructing, by a controller, three-dimensional positions of corresponding points in the image, calculating, by the controller, a disparity value by applying a virtual baseline value formed by a movement of the monocular camera to a depth value obtained through three-dimensional reconstruction of the corresponding points, and estimating, by the controller, a boundary of the obstacle based on the disparity value; and creating, by the controller, a distance based cost map, a color based cost map and an edge based cost map from the image, and estimating, by the controller, a height of the obstacle using the distance based cost map, the color based cost map, and the edge based cost map.

The disparity value is calculated using Equation 1:

$$d = f\frac{B}{Z},$$

where the 'd' is the disparity value to be obtained, the B is the virtual baseline value of the monocular camera, the Z is the depth value obtained through three-dimensional reconstruction, and the f is a focal length of the monocular camera.

The method further includes changing, when an angle of view of the monocular camera is a wide angle that is greater than or equal to a predetermined angle of view, a u-axis to an incident angular axis θu through Equation 2:

$$\theta_u = \text{atan}\left(\frac{u - o_x}{f}\right),$$

where the u is the value of the u-axis, the 0x is the center point of the monocular camera, and the f is the focal length of the monocular camera.

The creating of the distance based cost map includes: generating a plurality of Delaunay triangles by connecting feature points of the image and performing interpolation of distance information using a plane equation generated by three vertexes of each of the plurality of the Delaunay triangles; and estimating a disparity of pixels included in each of the plurality of the Delaunay triangles from a result of the interpolation.

The creating the color based cost map, includes: setting an area where color similarity measurement is to be performed in the image, measuring color similarities between all feature points existing in the area, and selecting a greatest color similarity value as a final color similarity; and creating the color based cost map by calculating a difference between sums of the color similarities from the measured color similarities.

The creating the edge based cost map, includes: performing edge detection on the image; and performing distance transform on a result of the edge detection such that pixels located closer to edges have lower values.

The final cost map is calculated by Equation 6:

$$c_t = w_d c_d + w_c c_c + w_e c_e, \qquad \text{<Equation 6>}$$

where $w_d$ is a weight of the distance cost map, $w_c$ is a weight of the color cost map, and $w_e$ is a weight of the edge cost map.

In accordance with another aspect of the present disclosure, a method of detecting an obstacle around a vehicle, includes: acquiring an image of the obstacle around the vehicle using a monocular camera; and reconstructing, by a controller, three-dimensional positions of corresponding points in the image, calculating, by the controller, a disparity value by applying a virtual baseline value formed by a movement of the monocular camera to a depth value obtained through the three-dimensional reconstruction of the corresponding points, and estimating, by the controller, a boundary of the obstacle based on the disparity value.

In another form of the present disclosure, a method of detecting an obstacle around a vehicle, includes: acquiring an image of the obstacle around the vehicle using a monocular camera; and creating, by a controller, a distance based cost map, a color based cost map, and an edge based cost map from the image, and estimating, by the controller, a height of the obstacle using the distance based cost map, the color based cost map, and the edge based cost map.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 9A-9B show removal and selection of the three-dimensional points;

FIGS. 11A-11B show a integration of a plurality of three-dimensional reconstruction results acquired with time intervals;

FIGS. 12A-12B show the results of obstacle boundary detection before and after performing temporal integration of three-dimensional points;

FIGS. 13A-13B show the u-axis range of the corresponding points and the number of disparities accumulated per u-axis;

FIGS. 17A-17B show distortion removal through image conversion;

FIGS. 18A-18C show interpolation through creation of Delaunay triangles;

FIGS. 22A-22B show calculation of an edge based cost map based on edge detection;

Figure 1:
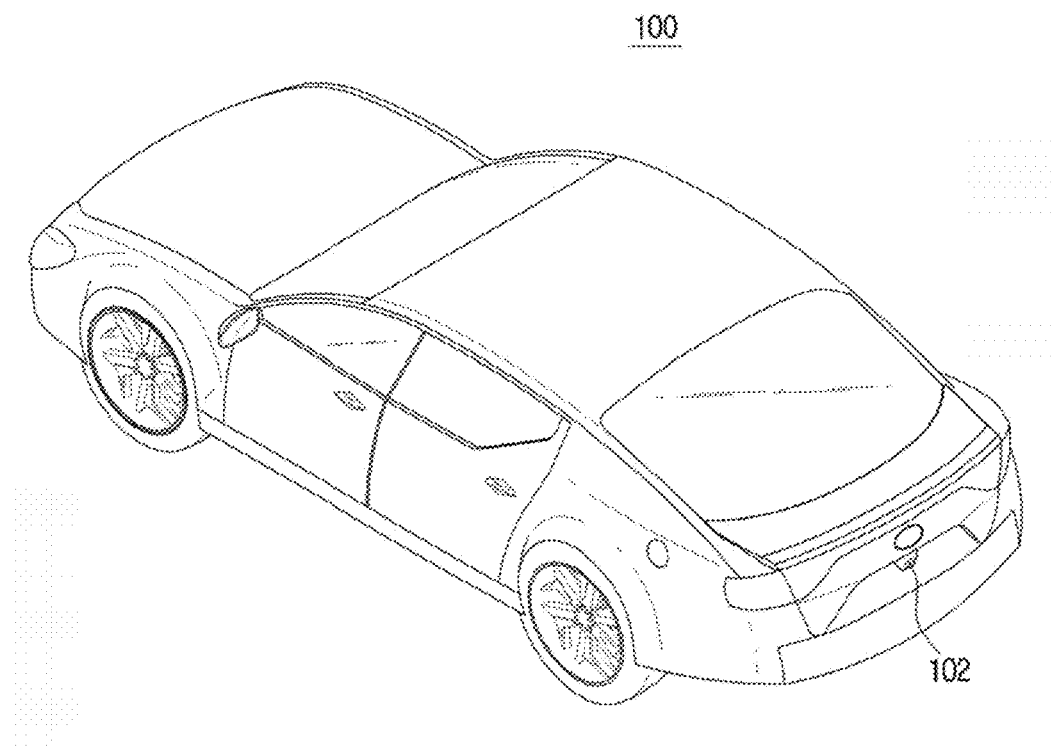
FIG. 1 shows a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the description of the present disclosure, drawings and forms shown in the drawings are exemplary examples of the disclosed present disclosure, and there can be various modifications that can replace the forms and the drawings of the present disclosure at the time of filing of the present disclosure.

FIG. 1 is shows a vehicle in one form of the present disclosure. A vehicle 100 shown in FIG. 1 may be an autonomous vehicle. At the rear of the vehicle 100 shown in FIG. 1, a monocular camera 102 for recognizing a three-dimensional (3D) environment around the vehicle 100 may be mounted. The monocular camera 102 may be equipped with a fisheye lens having an angle of view of 180 degrees.

The monocular camera 102 of the vehicle 100 may be a rear camera for photographing a rear view of the vehicle 100 when the vehicle 100 reverses. Alternatively, the monocular camera 102 of the vehicle 100 may be a camera mounted at the rear portion of the vehicle 100 among a plurality of cameras respectively mounted at the front, rear, left, and right portions of the vehicle 100 to create around view images of the vehicle 100.

An image photographed by the monocular camera 102 of the vehicle 100 may be image-processed by a controller (see 302 of FIG. 3), and then displayed on a display (for example, a navigation screen, see 316 of FIG. 3) of the vehicle 100.

Figure 2A:
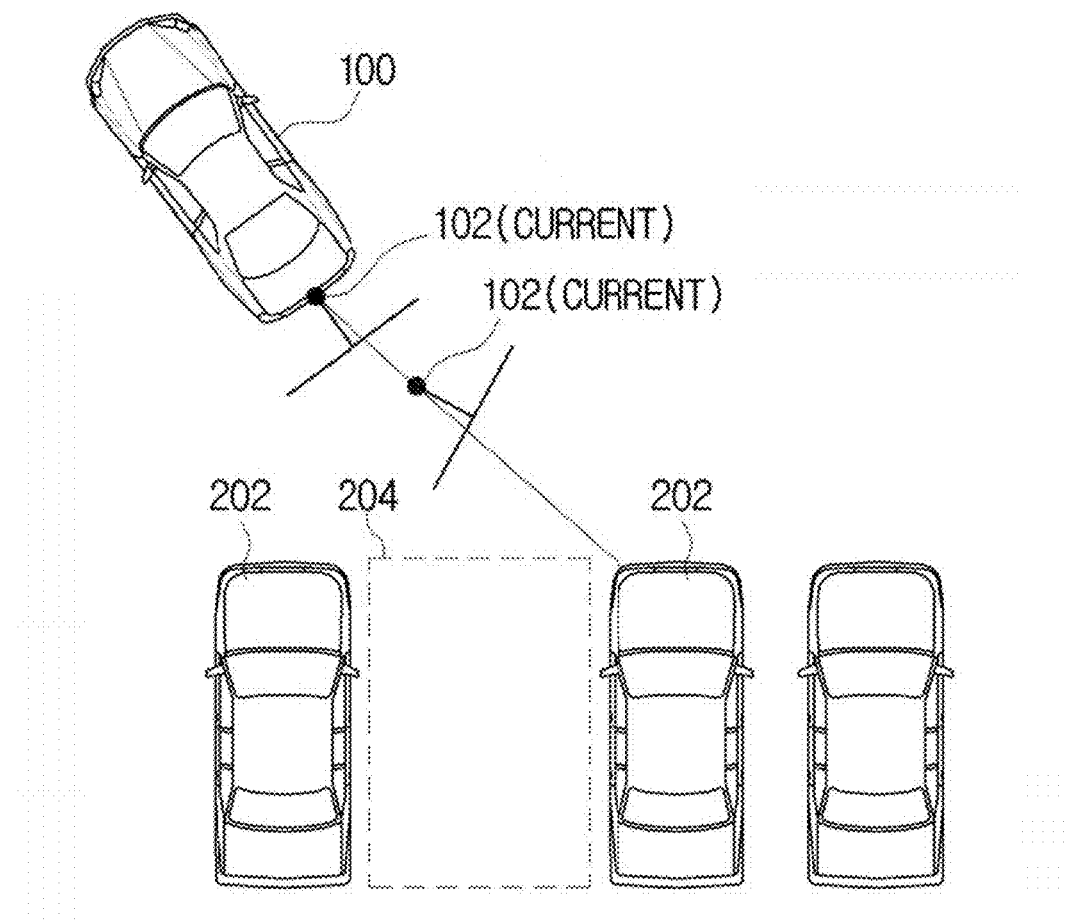
FIGS. 2A-2B show an obstacle boundary and an obstacle height detected by a monocular camera during autonomous driving of a vehicle.
Figure 2B:
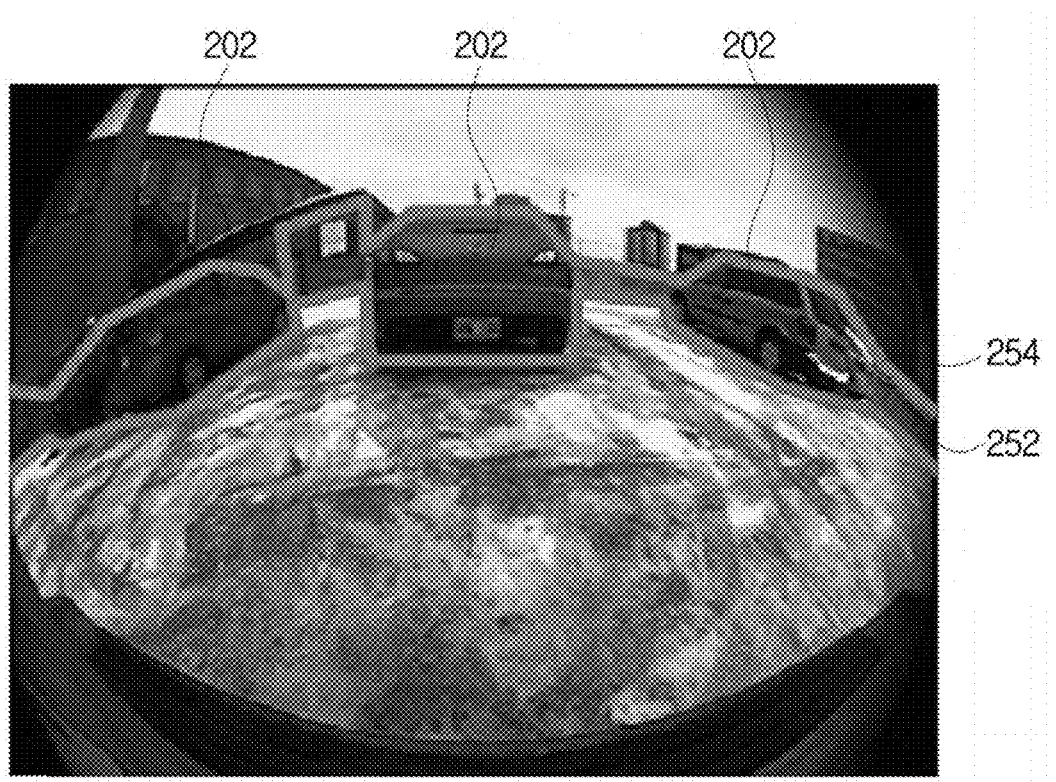

FIGS. 2A-2B show an obstacle boundary line and an obstacle height detected by the monocular camera during autonomous driving of the vehicle in one form of the present disclosure. The obstacle means an object that the vehicle 100 should avoid not to collide with it upon traveling. The obstacle may include another vehicle, a geographical feature, or a structure existing around the vehicle 100. When the monocular camera 102 of the vehicle 100 is used for autonomous driving as shown in FIG. 2A, operation in which the vehicle 100 detects surrounding obstacles 202 using the monocular camera 102 may be operation of estimating boundaries and heights of the obstacles 202. That is, as shown in FIG. 2B, the vehicle 100 may estimate a boundary line of the obstacles 202 and heights of the obstacles 202 to thereby distinguish empty parking space 204 from the obstacles 202.

Figure 3:
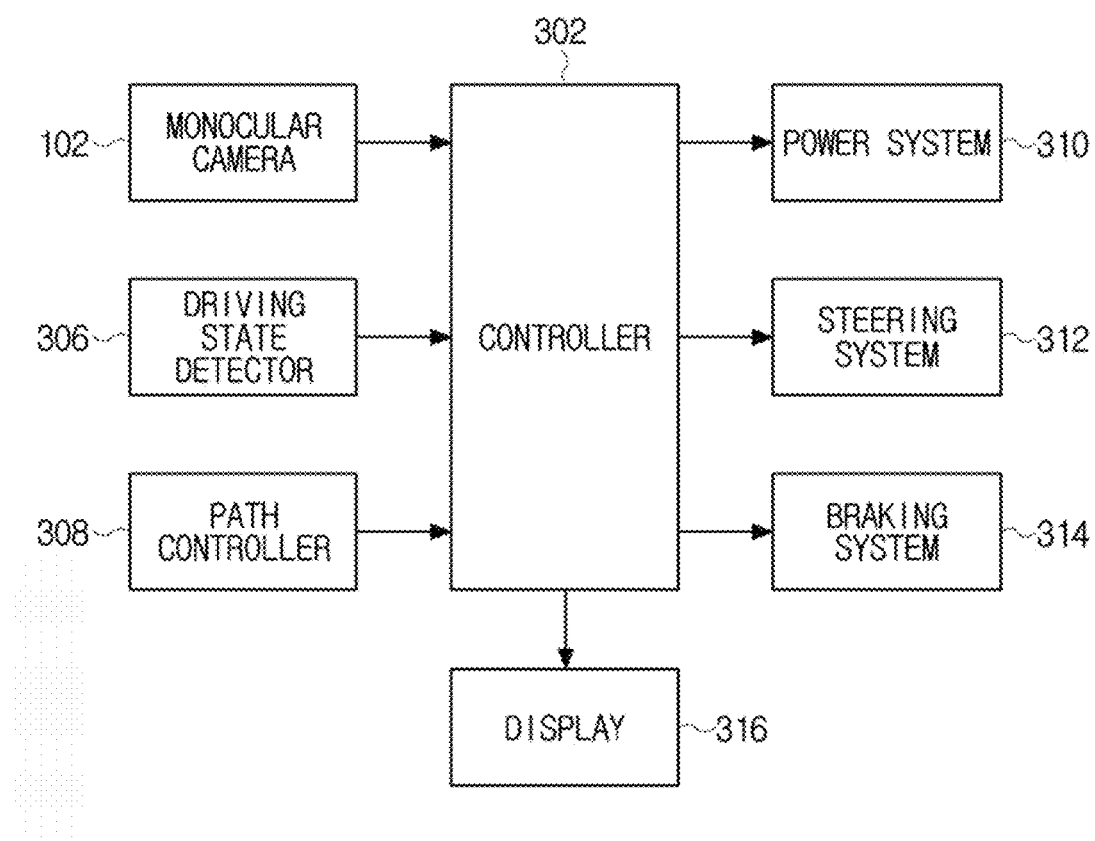
FIG. 3 shows a control system of the vehicle.

FIG. 3 is a block diagram illustrating control system of the vehicle in one form of the present disclosure. Specifically, the control system shown in FIG. 3 is to acquire information about an obstacle 202 around the vehicle 100 from an image photographed by the monocular camera 102, and to use the acquired information for autonomous driving.

The controller 302 may control overall operations related to driving of the vehicle 100. The controller 302 may be configured with a single Electronic Control Unit (ECU) or a plurality of ECUs interworking with each other. The monocular camera 102, a driving state detector 306, and a path controller 308 may be connected to input terminals of the controller 302 in such a way to communicate with each other. Power system 310, steering system 312, braking system 314, and a display 316 may be connected to output terminals of the controller 302 in such a way to communicate with each other.

The monocular camera 102 may photograph an around view (particularly, a rear view) of the vehicle 100 to create an image, as described above with reference to FIGS. 1 and 2A-2B. The image photographed by the monocular camera 102 may be transferred to the controller 302, and subjected to a series of image processing in one form of the present disclosure so as to be used to detect a status of an obstacle 202 around the vehicle 100.

The driving state detector 306 may include a plurality of sensors (for example, a vehicle speed sensor, a steering angle sensor, a yaw rate sensor, and an acceleration sensor) for detecting the driving state of the vehicle 100. The driving state detector 306 may detect a driving state of the vehicle 100, and transmit information on the detected driving state to the controller 302.

The path controller 308 may estimate a current position of the vehicle 100, create a path plan about a path along which the vehicle 100 moves, and transmit the path plan to the controller 302.

The power system 310 may include an engine and a transmission of the vehicle 100. The power system 310 may generate power from the engine, and transmit the power to the wheels so that the vehicle 100 can run.

The steering system 312 may use various kinds of sensors and control devices to provide steering stability of the vehicle 100 with respect to a steering input from a driver. For this, the steering system 312 may include Electronic Power Steering (EPS), Motor Driven Power Steering (MDPS), Active Front Steering (AFS), etc.

The braking system 314 may be used to reduce the speed of the vehicle 100 to stop the vehicle 100. The braking system 314 may put a brake on the vehicle 100 in response to a control signal from the controller 302. For this, the braking system 314 may include Anti-lock Brake System (ABS) and Electronic Stability Control (ECS) System.

The display 316 may be used to display a driving state of the vehicle 100 and information desired for driving of the vehicle 100. The display 316 may be an independently mounted display or a display attached to a multimedia device (e.g., Audio Video Navigation (AVN) system). On the screen of the display 316, an around view image of the vehicle 100, photographed by the monocular camera 102, or information provided for autonomous driving may be displayed.

Figure 4:
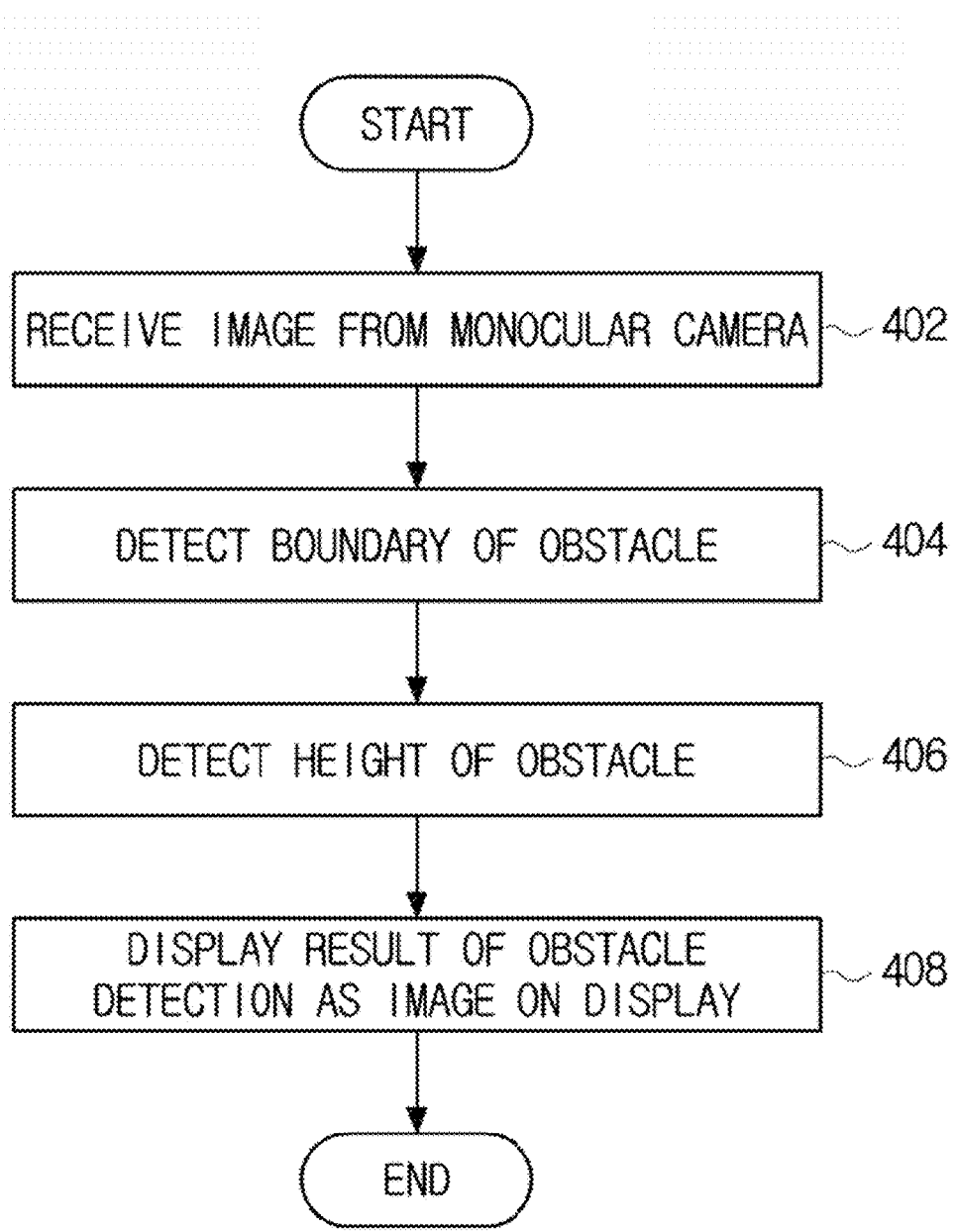
FIG. 4 shows a control method of a vehicle.

FIG. 4 is a flowchart illustrating a method of controlling the vehicle in one form of the present disclosure. According to the control method shown in FIG. 4, an around view image of the vehicle 100 may be photographed using the monocular camera 102, an obstacle 202 existing around the vehicle 100 may be detected from the around view image, and an image of the obstacle 202 may be displayed on the display 316. The vehicle 100 may detect the obstacle 202 existing around the vehicle 100 using only the monocular camera 102, instead of a binocular stereo camera, a radar, a lidar, and an ultrasonic sensor. The form of the present disclosure proposes a method of detecting a boundary of an obstacle and a method of estimating a height of an obstacle, including new features.

As shown in FIG. 4, the controller 302 may receive an image from the monocular camera 102 (in operation 402), detect a boundary and a height of the obstacle from the received image (in operations 404 and 406), and display information of the detected boundary and height of the obstacle on the display 316 (in operation 408).

Operation 404 of detecting the boundary of the obstacle may include: temporally integrating three-dimensional information in order to overcome limitations of non-dense three-dimensional information; creating a u-disparity efficiently based on angular information in a wide-angle condition; and generating a displacement value using a virtual baseline when there is no disparity information.

Operation 406 of detecting the height of the obstacle may include: estimating the height of the obstacle by merging distance information, color information, and edge information in order to overcome the limitations of non-dense three-dimensional information; and increasing the efficiency of calculation by forcing the obstacle to stand vertically on the image through a cylinder transform process in an image distortion condition.

Figure 5:
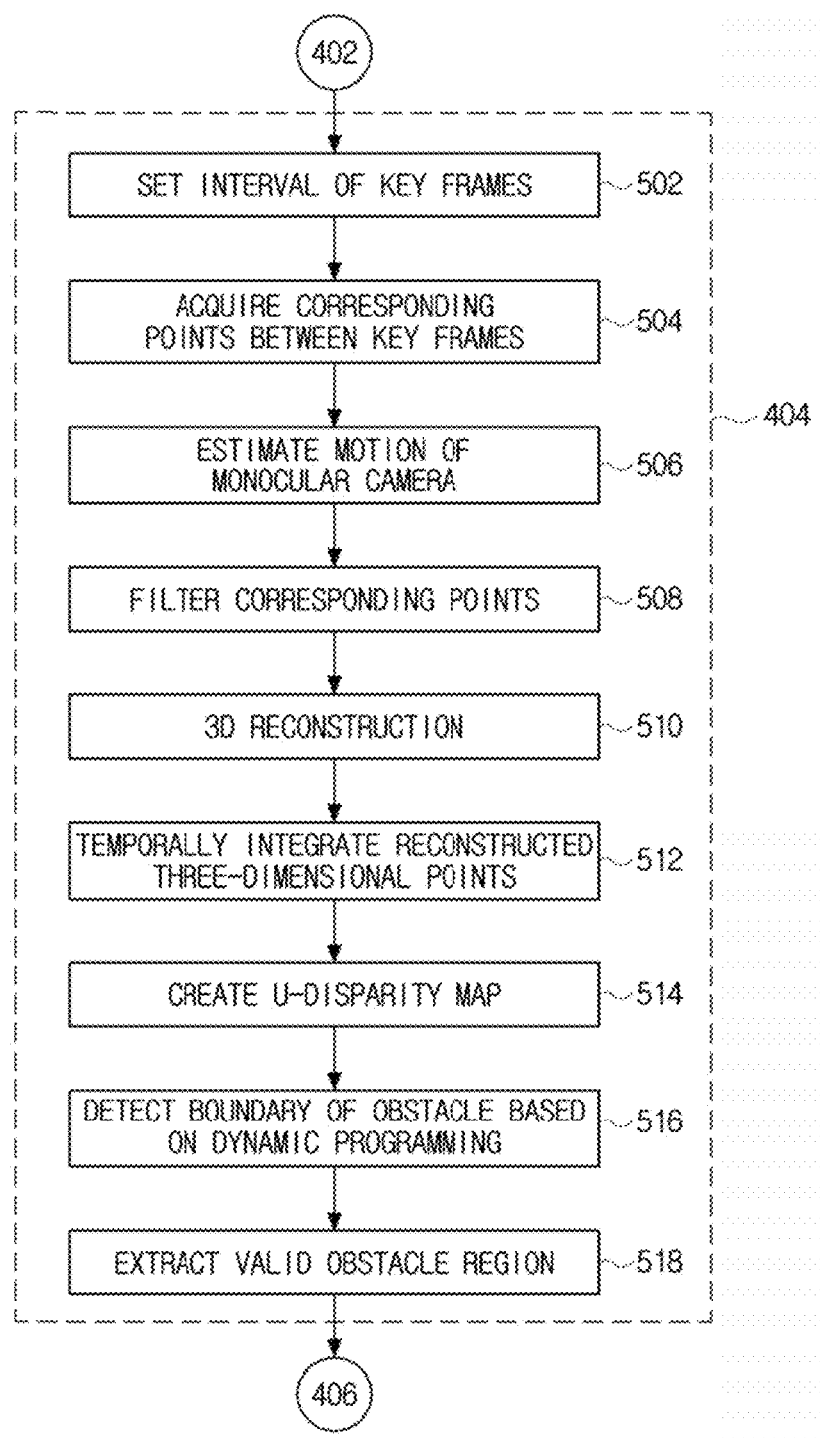
FIG. 5 shows a flowchart for a method of obstacle boundary detection.
Figure 6:
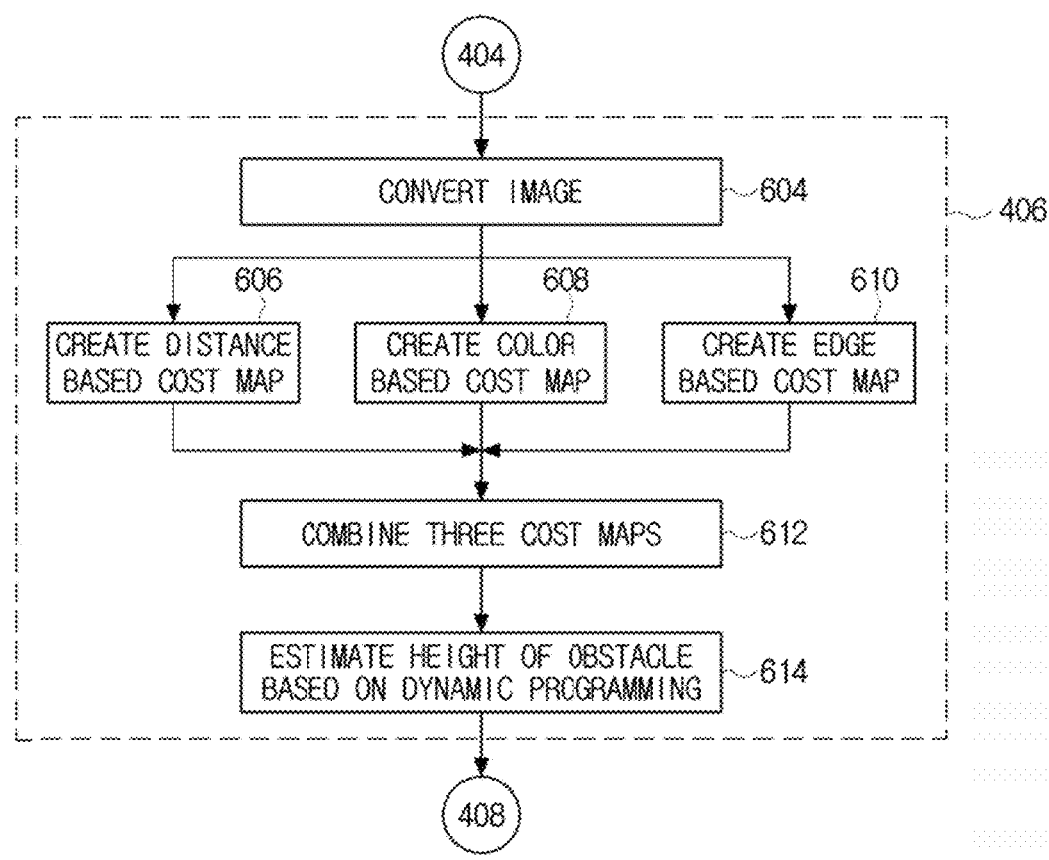
FIG. 6 shows a flowchart for a method of obstacle height detection.

Hereinafter, operation 404 of detecting the boundary of the obstacle and operation of detecting the height of the obstacle in the vehicle 100 in one form of the present disclosure will be described in detail with reference to FIGS. 5 to 24. FIG. 5 is a flowchart illustrating operation 404 of detecting the boundary of the obstacle, in detail, and FIG. 6 is a flowchart illustrating operation 406 of detecting the height of the obstacle, in detail. FIGS. 7 to 24 are views for assisting descriptions related to FIGS. 5 and 6.

Figure 7:
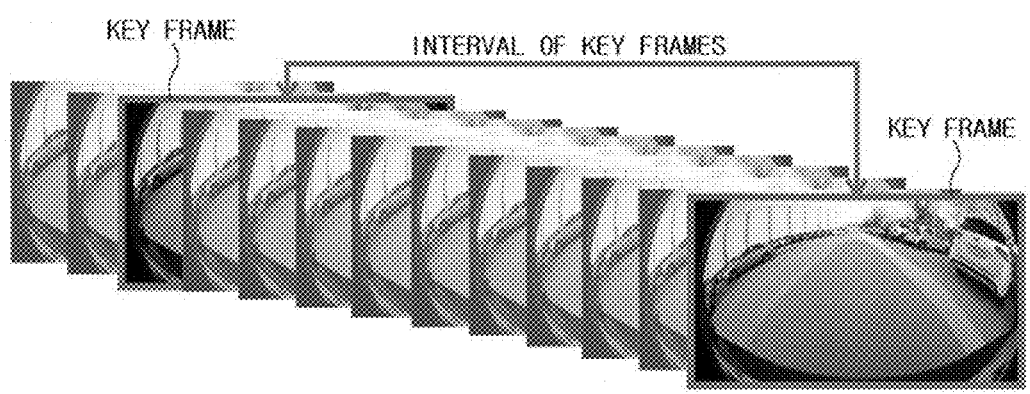
FIG. 7 shows key frames and their intervals.

As shown in FIG. 5, in order to detect the boundary of the obstacle, the controller 302 may set an interval of key frames for acquiring corresponding points from the image photographed by the monocular camera 102 (in operation 502). The interval of key frames means an interval between a pair of frames to be used for three-dimensional reconstruction. FIG. 7 is a diagram illustrating key frames and their intervals. As shown in FIG. 7, a pair of frames having an appropriate interval may be selected from among frames of the image photographed by the monocular camera 102, and corresponding points for 3D reconstruction on the selected pair of frames may be acquired. If the interval between the key frames is too small, or if corresponding points are obtained for all frames without any interval, three-dimensional reconstruction errors and an amount of data processing may increase excessively although the corresponding points can be easily acquired. In contrast, if the interval between key frames is too great, it may be difficult to acquire corresponding points although three-dimensional reconstruction errors and an amount of data processing are reduced. Therefore, it is desirable to set an appropriate interval of key frames through a tradeoff between three-dimensional reconstruction errors and ease in acquiring corresponding points.

Figure 8A:
FIGS. 8A-8B show the relationship of the corresponding points between a pair of key frames.
Figure 8B:

Returning to operation 404 of FIG. 5, the controller 302 may acquire corresponding points between the key frames (in operation 504). A relationship of corresponding points between a pair of key frames is shown in FIGS. 8A-8B. As shown in FIGS. 8A-8B, corresponding points indicate corresponding locations (the same locations on the real-world coordinates) in two key frames forming a pair. The controller 302 may restore three-dimensional information using a difference in location of the corresponding points in the two key frames. A Kanade-Lucas Tomasi (KLT) method may be used to acquire and track a large number of feature points from the surface of a road and the surfaces of vehicles (other vehicles photographed by the monocular camera 102) having a relatively small number of feature points. However, another method for acquiring corresponding points, instead of the KLT method, may be used.

Returning to operation 404 of FIG. 5, the controller 302 may estimate a movement of the monocular camera 102, in operation 506. Since the monocular camera 102 installed in the vehicle 100 moves together along a traveling trajectory of the vehicle 100, it may be desired to estimate a movement motion of the monocular camera 102 in order to accurately reconstruct a three-dimensional image. In order to estimate a movement of the monocular camera 102, fundamental matrix calculation may need to be performed based on the corresponding points. For the fundamental matrix calculation, a M-estimator Sample Consensus (MSAC) method may be used. In the MSAC method, a fundamental matrix is decomposed to estimate a movement of the monocular camera 102.

Also, the controller 302 may perform filtering on the corresponding points in order to remove corresponding points expected to generate a large error upon three-dimensional reconstruction, in operation 508. In the form of the present disclosure, the controller 302 may perform filtering on the corresponding points in various manners. For example, in a method of filtering corresponding points based on a fundamental matrix, corresponding points falling within a predetermined distance to epipolar lines are selected, and the remaining corresponding points are removed. According to another example, in a method of filtering corresponding points based on de-rotation, corresponding points of which lengths are longer than or equal to a predetermined length when the influence of rotation is excluded are selected, and the remaining corresponding points are removed.

Through the above-described process, the correspondence points, the movement of the monocular camera 102, and the internal variables of the monocular camera 102 may be acquired. The controller 302 may calculate and reconstruct three-dimensional locations of the corresponding points through triangulation based on the corresponding points, the movement of the monocular camera 102, and the internal variables of the monocular camera 102, in operation 510. Since three-dimensional points reconstructed using only images have no unit, the controller 302 may reconstruct the three-dimensional points in meters by using a movement distance of the monocular camera 102 acquired based on the odometry of the vehicle 100. However, since the area where the obstacle 202 likely to collide with the vehicle 100 exists is a main area of interest, as shown in FIGS. 9A-9B, three-dimensional points reconstructed from the ground may be removed, and three-dimensional points existing within a predetermined height range (for example, 25 cm to 200 cm) from the ground may be selected and reconstructed.

Returning to operation 404 of FIG. 5, the controller 302 may temporally integrate the reconstructed three-dimensional points, in operation 512. In order to secure dense three-dimensional shape information, it may perform three-dimensional reconstruction at predetermined time intervals and integrate the results of the reconstruction. In another from, the three-dimensional integration may be performed by reflecting both the movement of the monocular camera 102 and a movement distance acquired based on the odometry of the vehicle 100.

Figure 10:
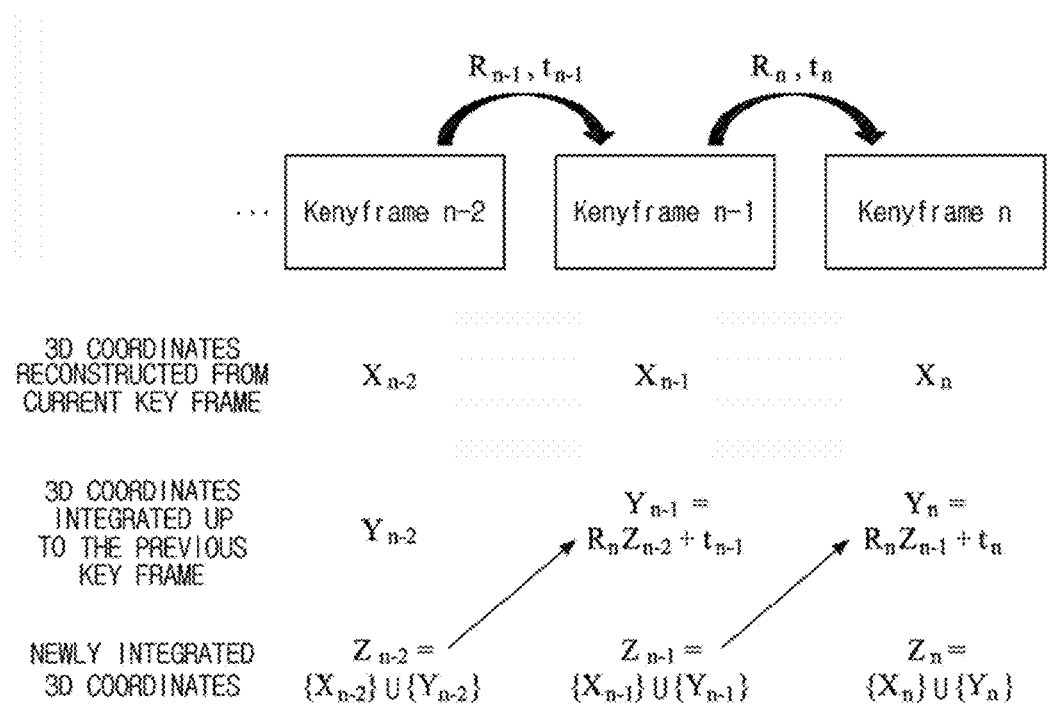
FIG. 10 shows a transform of the previously reconstructed three-dimensional points and integrating the previously reconstructed three-dimensional points with the currently reconstructed three-dimensional points.

That is, as shown in FIG. 10, the controller 302 may acquire a relative positional relationship (rotational and positional transformation) between the previously (past) reconstructed three-dimensional points and the currently reconstructed three-dimensional points by applying a movement of the monocular camera 102 and a movement distance acquired based on the odometry of the vehicle 100, and then transform the previously reconstructed three-dimensional points to integrate the previously reconstructed three-dimensional points with the currently reconstructed three-dimensional points.

FIGS. 11A-11B show a graph obtained by integrating a plurality of three-dimensional reconstruction results acquired with time intervals. In the graph shown in FIG. 11B, points having different brightness are three-dimensional points reconstructed at different time. As shown in FIGS. 11A-11B, denser three-dimensional points could be obtained by temporal integration.

FIGS. 12A-12B are diagrams illustrating the results of obstacle boundary detection before and after performing temporal integration on three-dimensional points. As shown in FIGS. 12A-12B, obstacle boundaries that have not been detected before performing temporal integration on three-dimensional points are correctly detected after performing temporal integration on the three-dimensional points.

Returning to operation 404 of FIG. 5, the controller 302 may create a u-disparity map using the following method, in operation 514. In a conventional stereo (binocular) camera, a u-disparity is generated using a dense disparity map, and Dynamic Programming (DP) is applied to the u-disparity to detect a boundary of an obstacle. However, when the single monocular camera 102 is used, like in the form of the present disclosure, it is difficult to use the method used in the conventional stereo (binocular) camera as it is. Therefore, in the form of the present disclosure, two new methods are proposed in order to obtain the same obstacle detection effect as that obtained through the conventional stereo (binocular) camera using only the monocular camera 102.

One of the two proposed methods is to calculate a disparity value from a motion stereo result. The disparity means a difference in distance on the horizontal axis between corresponding points of a pair of frames in an image of a rectified stereo camera. Unlike the case of the stereo camera, no disparity value can be calculated in the case of a motion stereo based on the monocular camera 102, so that a u-disparity cannot be generated. Therefore, in the case of using the monocular camera 102 as in the form of the present disclosure, a virtual baseline B may be applied to the depth value (Z) obtained by three-dimensional reconstruction to calculate a u-disparity value d according to Equation 1 below.

$$d = f\frac{B}{Z} \qquad \text{<Equation 1>}$$

In Equation 1, d is a disparity value to be obtained, B is a virtual baseline value of the monocular camera 102, Z is a depth value obtained through three-dimensional reconstruction, and f is a focal length of the monocular camera 102.

The other one of the proposed two methods is to generate a u-disparity suitable for a wide-angle condition. In the monocular camera 102, if a wide-angle lens such as a fisheye lens is adopted so that an angle of view is a wide angle, the range of the u-axis (the abscissa of an image) is very wide due to perspective projection. The wide u-axis greatly increases the u-disparity, which greatly increases memory usage and an amount of computation of the controller 302. Also, if the u-disparity is very large, disparities acquired by the fisheye lens are not sufficiently accumulated.

FIGS. 13A-13B show the u-axis range (the upper part of FIG. 13) of the corresponding points and the number of disparities accumulated per u-axis (lower part of the FIG. 13). As shown in FIG. 13B, if the u-axis range is very wide, disparities accumulated per u-axis are very small. In the form of the present disclosure, the u-axis is changed to an incidence angular axis $\theta_u$ in order to solve this problem. At this time, θ is generated by dividing the resolution between −90 degrees and +90 degrees in unit of 1 degree. That is, when the angle of view is 180 degrees at the right and left sides of the center point of the monocular camera 102, the angle of view of 180 degrees is divided by 1 degree into flabellate shape, and an incident angle axis $\theta_u$ for each angle θ is calculated. The incident angle axis $\theta_u$ may be obtained according to Equation 2 below.

$$\theta_u = \operatorname{atan}\left(\frac{u - o_x}{f}\right) \qquad \text{<Equation 2>}$$

In Equation 2, u is a value of the u-axis, $O_x$ is the center point of the monocular camera 102, and f is a focal length of the monocular camera 102.

Figure 14:
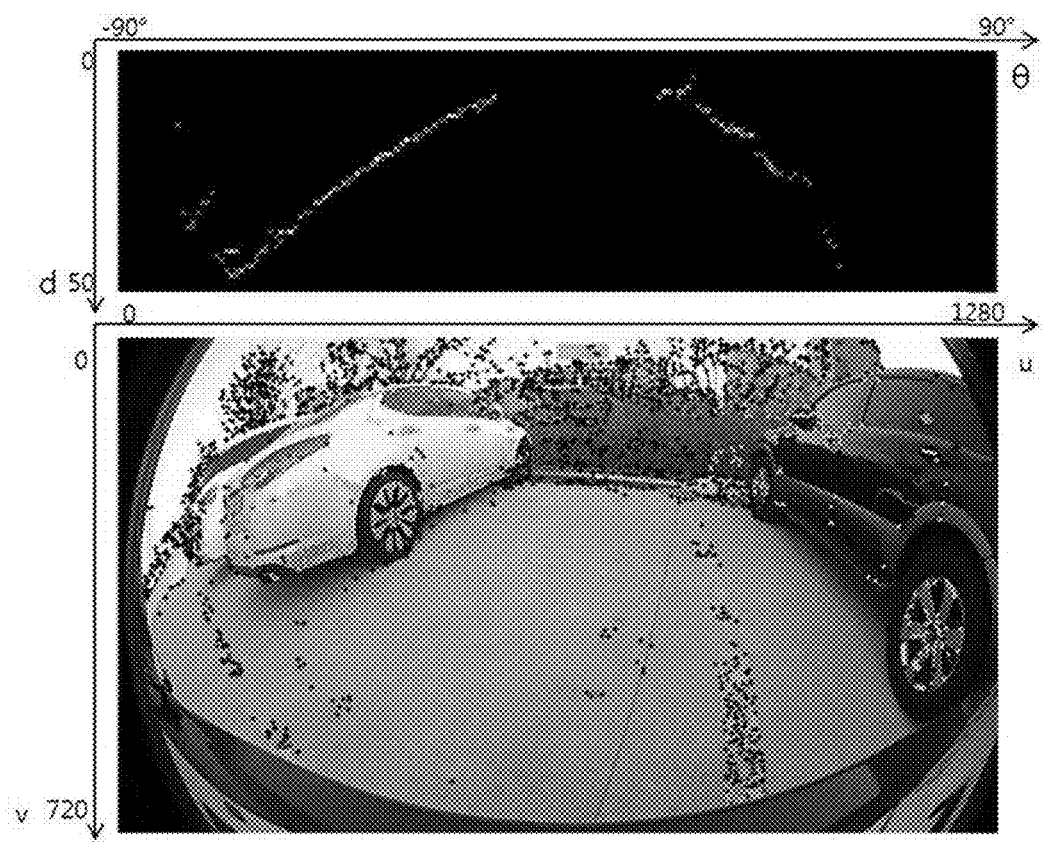
FIG. 14 shows the u-disparity map, the associated image, and the corresponding points generated.

The u-disparity map is shown in FIG. 14. FIG. 14 shows a u-disparity map created in one form of the present disclosure, an image related to the u-disparity map, and corresponding points.

Returning to operation 404 of FIG. 5, the controller 302 may perform operation of detecting an optimal path based on DP using a cost function C, as expressed in Equations 3 to 5 below, in order to estimate a spatially smooth obstacle boundary in the u-disparity obtained through the above-described method in the form of the present disclosure, in operation 516.

$$C(\theta, d_0, d_1) = E_D(\theta, d_0) + E_S(d_0, d_1) \qquad \text{<Equation 3>}$$

$$E_D(\theta, d_0) = -L(\theta, d_0) \qquad \text{<Equation 4>}$$

$$E_S(d_0, d_1) = \begin{cases} -c_s I(d_0, d_1), & \text{if } I(d_0, d_1) < T_s \\ -c_s T_s, & \text{if } I(d_0, d_1) \geq T_s \end{cases} \qquad \text{<Equation 5>}$$

In Equations 3 to 5, θ is any arbitrary angle within the angle of view of the monocular camera 102, $d_0$ and $d_1$ are disparities, $E_D$ is a data term, $E_S$ is a smoothness term, $L(\theta, d_0)$ is an accumulated value of a location $(\theta, d_0)$ of the u-disparity, $I(d_0, d_1)$ is an absolute value of a difference in distance on the Z axis between $d_0$ and $d_1$, $c_S$ is a weight of the smoothness term, and $T_S$ is a maximum value of the difference in distance on the Z axis.

Figure 15:
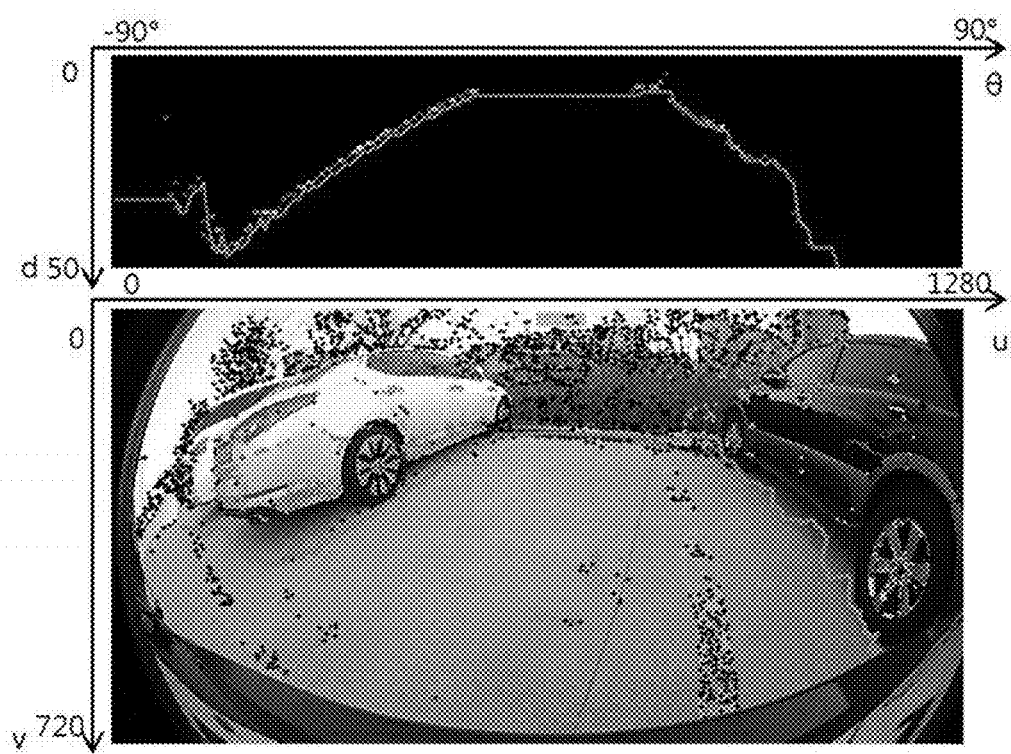
FIG. 15 shows an optimal path detection result based on the dynamic programming (DP) using the cost function.

FIG. 15 shows a result obtained by detecting an optimal path based on DP using the cost function expressed in Equations 3 to 5. In FIG. 15, the upper figure shows an obstacle boundary detected from a u-disparity, and the lower figure shows an image on which the obstacle boundary is represented.

Returning to FIG. 5, the controller 302 may extract a valid obstacle region from the detected obstacle boundary, in operation 518. An obstacle boundary detected based on DP includes not only the accumulation of three-dimensional points, but also locations connected and detected when a path is created based on DP. Therefore, the detected obstacle boundary can be divided into a valid region and an invalid region.

Figure 16:
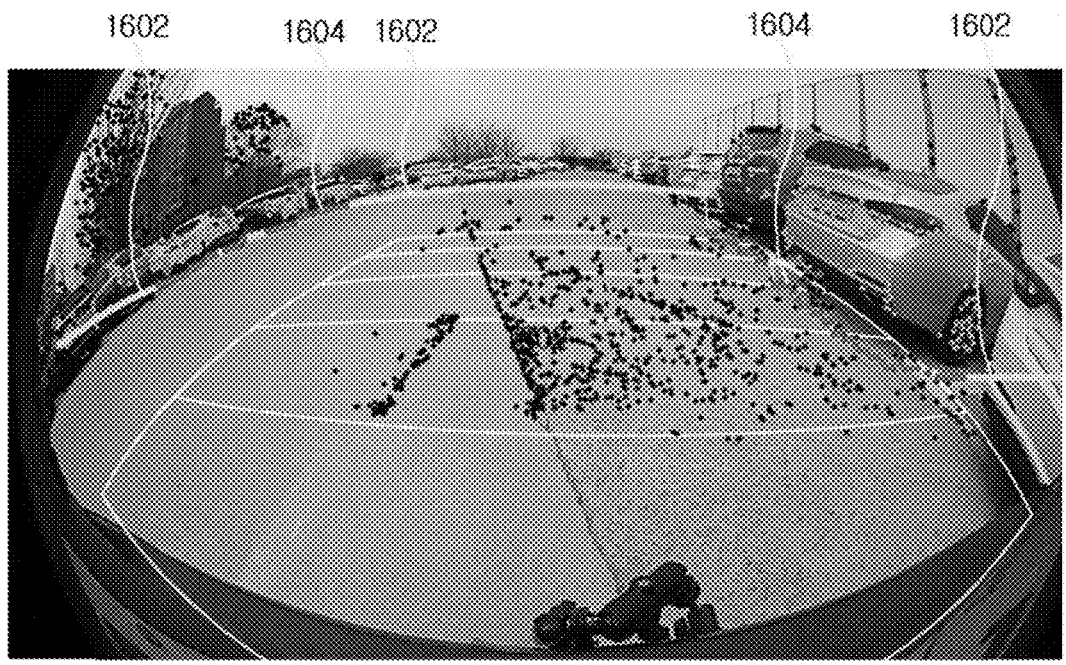
FIG. 16 shows a valid boundary region of the entire obstacle boundary.

For this reason, the controller 302 may classify positions at which the result of accumulation exists on a path of u-disparities as valid obstacle boundaries, and classify positions at which no result of accumulation exists as invalid obstacle boundaries. FIG. 16 is a diagram illustrating a valid boundary region of the entire obstacle boundary. In FIG. 16, regions denoted by a reference numeral 1602 are obstacle boundaries detected based on DP, and regions denoted by a reference numeral 1604 are valid obstacle boundaries.

FIG. 6 is a flowchart illustrating operation 406 of detecting a height of an obstacle in the vehicle in the form of the present disclosure. In operation 406 of detecting the height of the obstacle as shown in FIG. 6, the controller 302 may create three cost maps, and integrate the three cost maps to estimate the height of the obstacle.

As first operation for detecting the height of the obstacle, the controller 302 may convert an image photographed by the monocular camera 102, in operation 604. FIGS. 17A-17B are views for describing distortion removal through image conversion in the form of the present disclosure. Through the image conversion, distortion is removed from an image distorted by a wide-angle lens (for example, a fish-eye lens) as shown in FIG. 17A so that the image is converted into an image shown in FIG. 17B. The controller 302 may reduce an amount of computation by performing image conversion under an assumption that the obstacle 202 is erected along the vertical axis of the image. However, it is impractical to use the assumption that the obstacle 202 is erected along the vertical axis of the image if the monocular camera 102 is inclined or if distortion exists by the fish-eye lens. Accordingly, the above assumption may be made by compensating the angle of the monocular camera 102 and performing image conversion based on a cylindrical projection method. As shown in FIGS. 17A-17B, obstacles appearing on the image after the image conversion stand in the same direction as the vertical axis of the image.

Returning to operation 406 of FIG. 6, the controller 302 may create three cost maps from the converted image, in operations 606, 608, and 610. In the form of the present disclosure, the controller 302 may create three cost maps using three methods: a method 606 of creating a cost map based on distance; a method 608 of creating a cost map based on color; and a method 610 of creating a cost map based on edge.

First, the controller 302 may create a distance based cost map from the converted image, in operation 606. Distance information acquired through a motion stereo based on the monocular camera 102 has a limitation of insufficient density to estimate the height of the obstacle 202. Therefore, in the form of the present disclosure, interpolation may be performed on acquired distance information to obtain accurate distance information.

The controller 302 may create Delaunay triangles as shown in FIGS. 18A-18C based on feature points, and then perform interpolation of distance information using a plane Equation formed by three vertexes of the Delaunay triangles. FIGS. 18A-18C are a diagram illustrating interpolation through creation of Delaunay triangles in the form of the present disclosure. In each of the Delaunay triangles shown in FIGS. 18A-18C, three-dimensional coordinates of each vertex are x and y coordinates and disparity values of the image. The controller 302 may estimate disparities of all pixels in the Delaunay triangles after acquiring the plane Equation of the Delaunay triangles. The controller 302 can obtain dense disparities by applying the above-described procedure to all the Delaunay triangles.

Figure 19A:
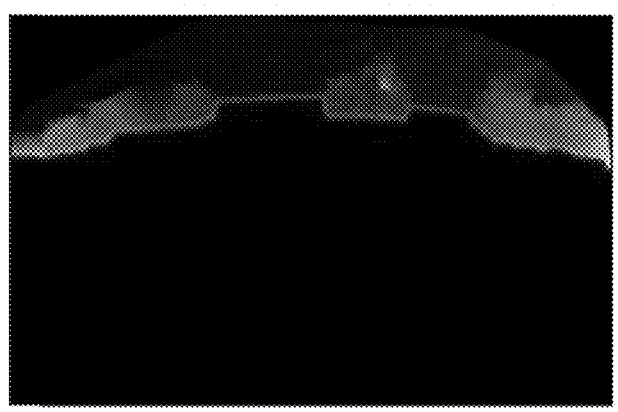
FIGS. 19A-19C show calculation of disparity similarity and a result thereof.
Figure 19B:
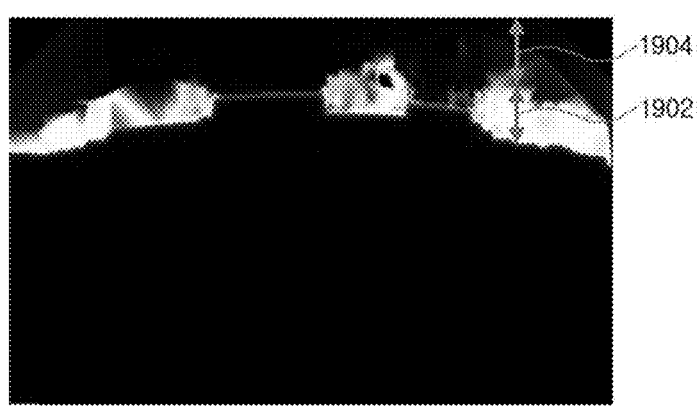
Figure 19C:
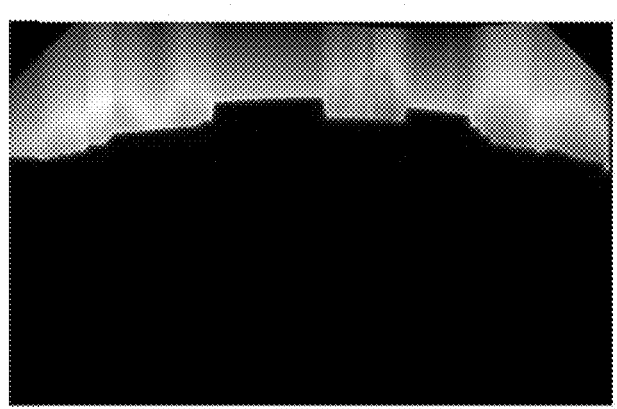

The disparity of the obstacle boundary may need to be similar to the disparity of the obstacle. Accordingly, the controller 302 may calculate similarity between the disparity of the obstacle boundary and the disparity of the obstacle. FIGS. 19A-19C are views for describing calculation of disparity similarity in the form of the present disclosure and the result of the calculation. FIG. 19A shows density of a disparity map, and FIG. 19B shows a calculated result of the disparity similarity. In the calculated result of the disparity similarity as shown in FIG. 19B, a position at which a difference between a sum of similarities of vertical direction disparities of an arrow area indicated by a reference numeral 1902 and a sum of similarities of vertical direction disparities of an arrow area indicated by a reference numeral 1904 becomes maximum is a position indicating the height of the obstacle. Therefore, a difference between disparity similarity sums of areas above and below a specific location on the disparity similarity may be set to a distance based cost map. FIG. 19C shows a calculated result of a distance based cost map in the form of the present disclosure.

Figure 20:
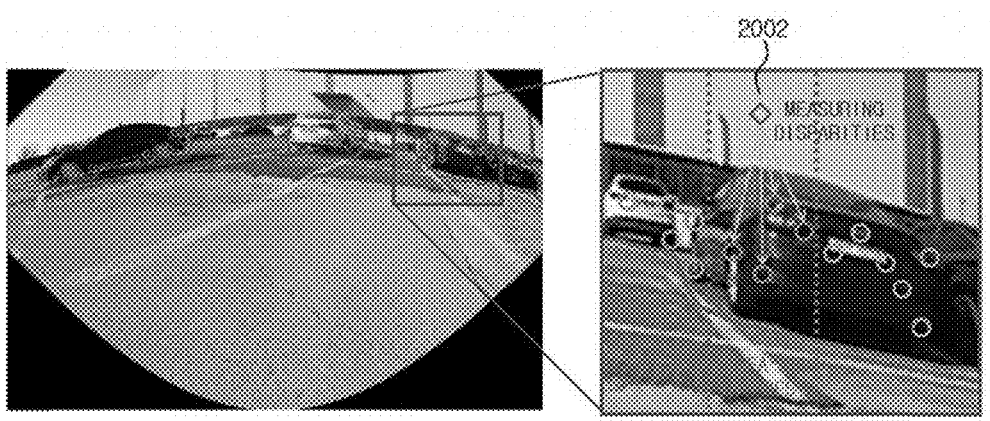
FIG. 20 shows setting an area of interest and measuring disparity to obtain color based obstacle height information.

Returning to operation 406 of FIG. 6, the controller 302 may create a color based cost map from the converted image, in operation 608. FIG. 20 is a view for describing operation of setting an area of interest and measuring disparities in order to obtain information about a height of an obstacle based on color in one form of the present disclosure. In FIG. 20, feature points (portions indicated by circles) participating in detecting an obstacle boundary are likely to be present on the obstacle. Therefore, by measuring color similarities between the feature points, probabilities that the features points belong to the obstacle can be determined. As shown in FIG. 20, the controller 302 may set an area for which color similarity will be measured to an area 2002 of interest, measure color similarities between all feature points existing in the area 2002 of interest, and select a greatest color similarity value as a final color similarity value.

Figure 21A:
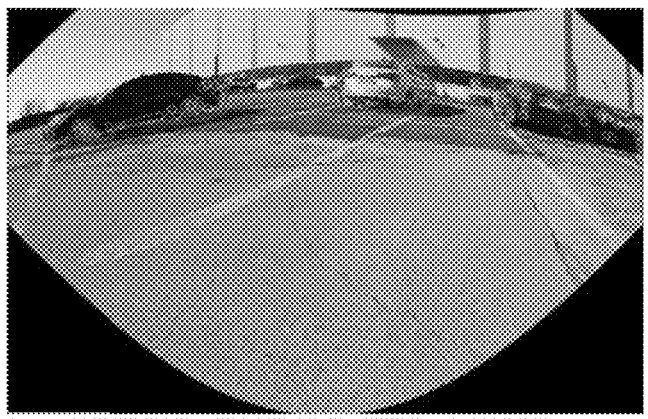
FIGS. 21A-21C show a calculation process of the color based cost map based on the color similarity calculation.
Figure 21B:
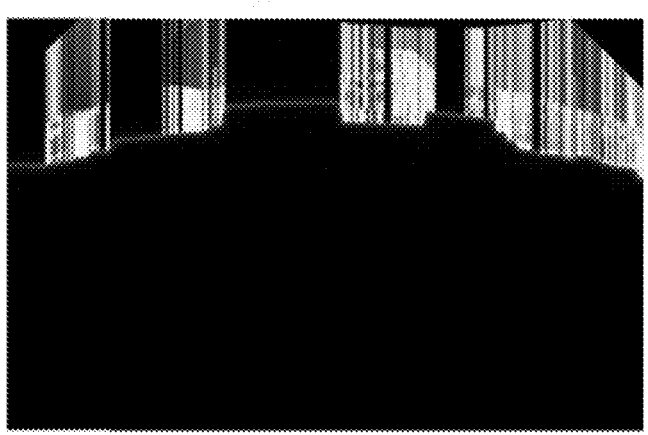
Figure 21C:
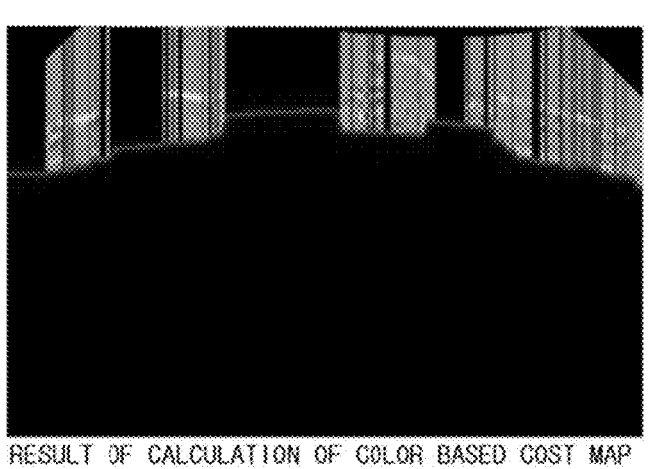

A color similarity may be calculated by subtracting a maximum value from a Euclidean distance of a RGB value. FIGS. 21A-21C are views for describing a process of calculating a color-based cost map based on color similarity calculation. FIG. 21A shows a converted image and feature points, FIG. 21B shows the result of color similarity calculation, and FIG. 21C shows a result of the color based cost map calculation. As shown in FIG. 21B, a position at which a great similarity difference appears in the vertical direction of an image is a position indicating a height of an obstacle. Accordingly, the controller 302 may calculate a difference between color similarity sums for predetermined areas below and above a specific position from the color similarity calculation result, and create a color based cost map as shown in FIG. 21C based on the difference.

Returning to operation 406 of FIG. 6, the controller 302 may create an edge based cost map from the converted image, in operation 610. Generally, there is a strong edge component at a boundary between an obstacle and a non-obstacle. Since the result of edge detection has a binary value, it is inappropriate to use the result of edge detection as a cost map. Therefore, the controller 302 may modify the result of edge detection result through distance transform such that pixels located closer to edges have lower values, thereby creating an edge based cost map. FIGS. 22A-22B are views for describing calculation of an edge based cost map based on edge detection in one form of the present disclosure. FIG. 22B shows an edge based cost map calculated based on one form of the present disclosure.

Figure 23:
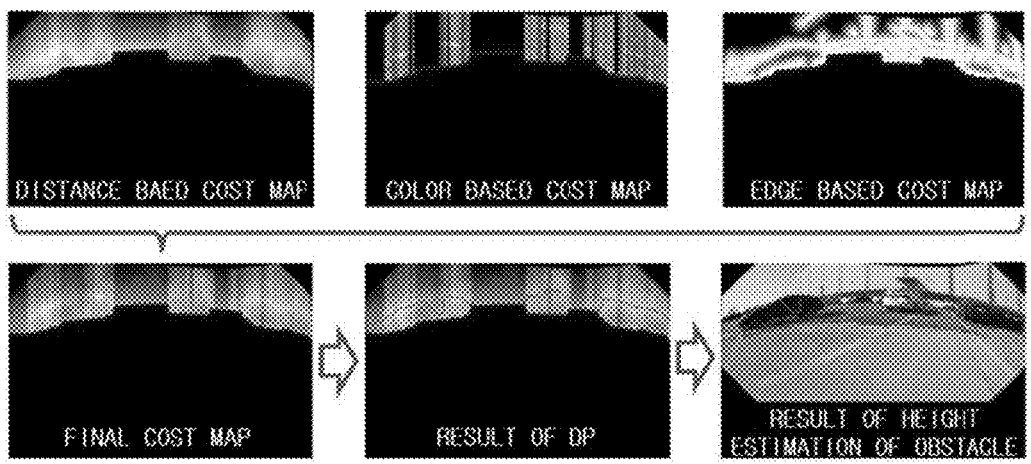
FIG. 23 shows a result of applying a cost map integration process, a dynamic programming application, and a final obstacle height estimation result to an actual image.

Returning to operation 406 of FIG. 6, the controller 302 may combine the distance based cost map, the color based cost map, and the edge based cost map to generate an integrated final cost map as shown in the lower left figure of FIG. 23, in operation 612.

Also, the controller 302 may estimate the height of the obstacle through DP-based information fusion from the final cost map, in operation 614. The controller 302 may assign weights to a cost map calculated based on distance $c_d$, color $c_c$, and edge $c_e$, as expressed by Equation 6 below, and then calculate a weighted sum.

$$c_t = w_d c_d + w_c c_c + w_e c_e \qquad \text{<Equation 6>}$$

In Equation 6, $w_d$, $w_c$, and $w_e$ are weights of the distance cost map, the color cost map, and the edge cost map, respectively. $c_t$ obtained by the weighted sum may be the cost map for estimating the final height of the obstacle. The height of the obstacle may be estimated by applying DP to the final cost map. FIG. 23 shows the results obtained by applying cost map integration, application of DP, and the results of final height estimation of the obstacle to an actual image.

Figure 24:
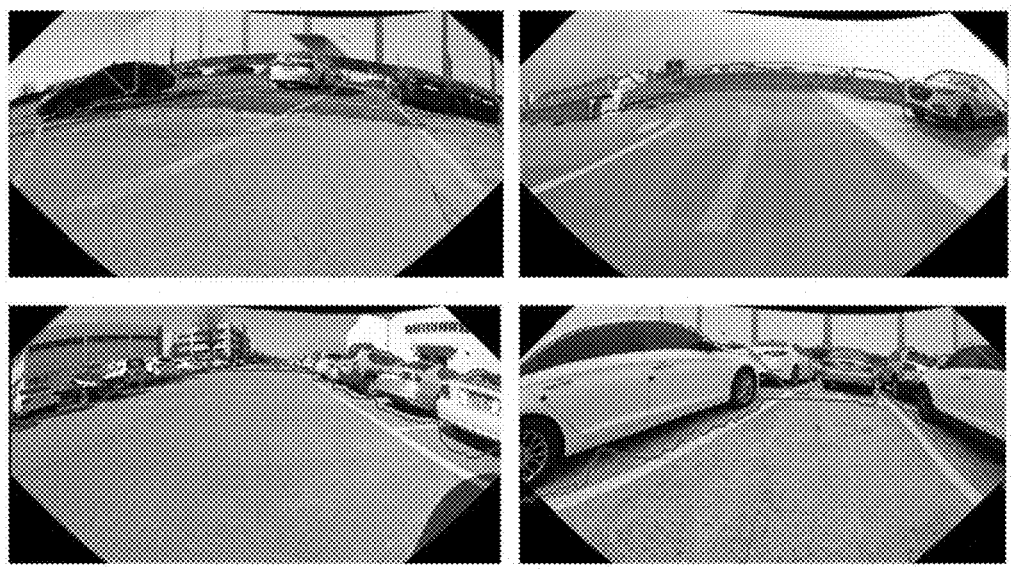
FIG. 24 shows the final result of estimating the boundary and height of the obstacle 202 through a series of processes.

FIG. 24 shows final results obtained by estimating the boundary and height of the obstacle through a series of processes in one form of the present disclosure. As shown in FIG. 24, the boundary and height of the obstacle may be accurately detected by the monocular camera 102 through the obstacle boundary estimation and the obstacle height estimation in the forms of the present disclosure.

It is to be understood that the above description is only illustrative of technical ideas, and various modifications, alterations, and substitutions are possible without departing from the desired characteristics of the present disclosure. Therefore, the forms and the accompanying drawings described above are intended to illustrate and not limit the technical idea, and the scope of technical thought is not limited by these forms and accompanying drawings. The scope of which is to be construed in accordance with the present disclosure, and all technical ideas which are within the scope of the same should be interpreted as being included in the scope of the right.

What is claimed is:

1. A method of detecting an obstacle around a vehicle, comprising:
    acquiring an image of the obstacle around the vehicle using a monocular camera;
    creating, by a controller, a distance based cost map, a color based cost map and an edge based cost map from the image; and
    integrating, by the controller, the distance based cost map, the color based cost map, and the edge based cost map to generate a final cost map, and estimating by the controller a height of the obstacle from the final cost map.

2. The method of claim 1, wherein the creating of the distance based cost map comprises:
    generating a plurality of Delaunay triangles by connecting feature points in the image and performing interpolation of distance information using a plane equation generated by three vertexes of each of the plurality of the Delaunay triangles; and
    estimating a disparity of pixels included in each of the plurality of the Delaunay triangles from a result of the interpolation.

3. The method of claim 1, wherein the creating of the color based cost map comprises:
    setting an area where color similarities are measured in the image, measuring the color similarities between all feature points existing in the area, and selecting a greatest color similarity value as a final color similarity; and
    calculating a difference between sums of the color similarities from the measured color similarities to create the color based cost map.

4. The method of claim 1, wherein the creating of the edge based cost map comprises:
    performing edge detection on the image; and
    performing distance transformation based on edge detection such that pixels located closer to an edge have lower values.

5. The method of claim 1, wherein the final cost map is calculated as:

$$c_t = w_d c_d + w_c c_c + w_e c_e,$$

where: $w_d$ is a weight of the distance based cost map, $w_c$ is a weight of the color based cost map, $w_e$ is a weight of the edge based cost map, $c_d$ is the distance based cost map, $c_c$ is the color based cost map, and $c_e$ is the edge based cost map.

6. A method of detecting an obstacle around a vehicle, comprising:
    acquiring an image of the obstacle around the vehicle using a monocular camera;
    reconstructing, by a controller, three-dimensional positions of corresponding points in the image;
    integrating, by the controller, previously reconstructed three-dimensional corresponding points with the currently reconstructed three-dimensional corresponding points based on a relative positional relationship between the previously reconstructed three-dimensional corresponding points and the currently reconstructed three-dimensional corresponding points;
    calculating, by the controller, a disparity value by applying a virtual baseline value formed by a movement of the monocular camera to a depth value obtained through three-dimensional reconstruction of the corresponding points; and
    estimating, by the controller, a boundary of the obstacle based on the disparity value.

7. The method of claim 6, wherein the disparity value is calculated as:

$$d = f \frac{B}{Z},$$

where, the d is the disparity value to be obtained, the B is the virtual baseline value of the monocular camera, the Z is the depth value obtained through three-dimensional reconstruction, and the f is a focal length of the monocular camera.

8. The method of claim 6, further comprises changing, when an angle of view of the monocular camera is a wide angle that is greater than or equal to a predetermined angle of view, a u-axis to an incident angular axis θu through the following equation:

$$\theta_u = \mathrm{atan}\left(\frac{u - o_x}{f}\right),$$

where, the u is the value of the u-axis which is the horizontal axis of the image, the $0_x$ is the center point of the monocular camera, and the f is the focal length of the monocular camera.

9. A method of detecting an obstacle around a vehicle, comprising:
acquiring an image of the obstacle around the vehicle using a monocular camera;
reconstructing, by a controller, three-dimensional positions of corresponding points in the image, calculating, by the controller, a disparity value by applying a virtual baseline value formed by a movement of the monocular camera to a depth value obtained through three-dimensional reconstruction of the corresponding points, and estimating a boundary of the obstacle based on the disparity value by the controller; and
creating, by the controller, a distance based cost map, a color based cost map and an edge based cost map from the image, and estimating, by the controller, a height of the obstacle using the distance based cost map, the color based cost map, and the edge based cost map.

10. The method of claim 9, wherein the disparity value is calculated as:

$$d = f\frac{B}{Z},$$

where the 'd' is the disparity value to be obtained, the B is the virtual baseline value of the monocular camera, the Z is the depth value obtained through three-dimensional reconstruction, and the f is a focal length of the monocular camera.

11. The method of claim 9, further comprising changing, when an angle of view of the monocular camera is a wide angle that is greater than or equal to a predetermined angle of view, a u-axis to an incident angular axis θu through the following equation:

$$\theta_u = \operatorname{atan}\left(\frac{u - o_x}{f}\right),$$

where the u is the value of the u-axis which is the horizontal axis of the image, the $0_x$ is the center point of the monocular camera, and the f is the focal length of the monocular camera.

12. The method of claim 9, wherein the creating of the distance based cost map comprises:
generating a plurality of Delaunay triangles by connecting feature points of the image and performing interpolation of distance information using a plane equation generated by three vertexes of each of the plurality of the Delaunay triangles; and
estimating a disparity of pixels included in each of the plurality of the Delaunay triangles from a result of the interpolation.

13. The method of claim 9, wherein the creating of the color based cost map comprises:
setting an area where color similarity measurement is to be performed in the image, measuring color similarities between all feature points existing in the area, and selecting a greatest color similarity value as a final color similarity; and
creating the color based cost map by calculating a difference between sums of the color similarities from the measured color similarities.

14. The method of claim 9, wherein the creating of the edge based cost map comprises:
performing edge detection on the image; and
performing distance transform on a result of the edge detection such that pixels located closer to edges have lower values.

15. The method of claim 9, wherein a final cost map is calculated as:

$$c_t = w_d c_d + w_c c_c + w_e c_e,$$

where $w_d$ is a weight of the distance based cost map, $w_c$ is a weight of the color based cost map, $w_e$ is a weight of the edge based cost map, and $c_d$ is the distance based cost map, $c_c$ is the color based cost map, and edge $c_e$ is the edge based cost map.

16. A method of detecting an obstacle around a vehicle, comprising:
acquiring an image of the obstacle around the vehicle using a monocular camera; and
reconstructing, by a controller, three-dimensional positions of corresponding points in the image, calculating by the controller a disparity value by applying a virtual baseline value formed by a movement of the monocular camera to a depth value obtained through the three-dimensional reconstruction of the corresponding points, and estimating a boundary of the obstacle based on the disparity value by the controller.

17. A method of detecting an obstacle around a vehicle, comprising:
acquiring an image of the obstacle around the vehicle using a monocular camera; and
creating, by a controller, a distance based cost map, a color based cost map, and an edge based cost map from the image, and estimating by the controller a height of the obstacle using the distance based cost map, the color based cost map, and the edge based cost map.

* * * * *